Figures 1, 3:
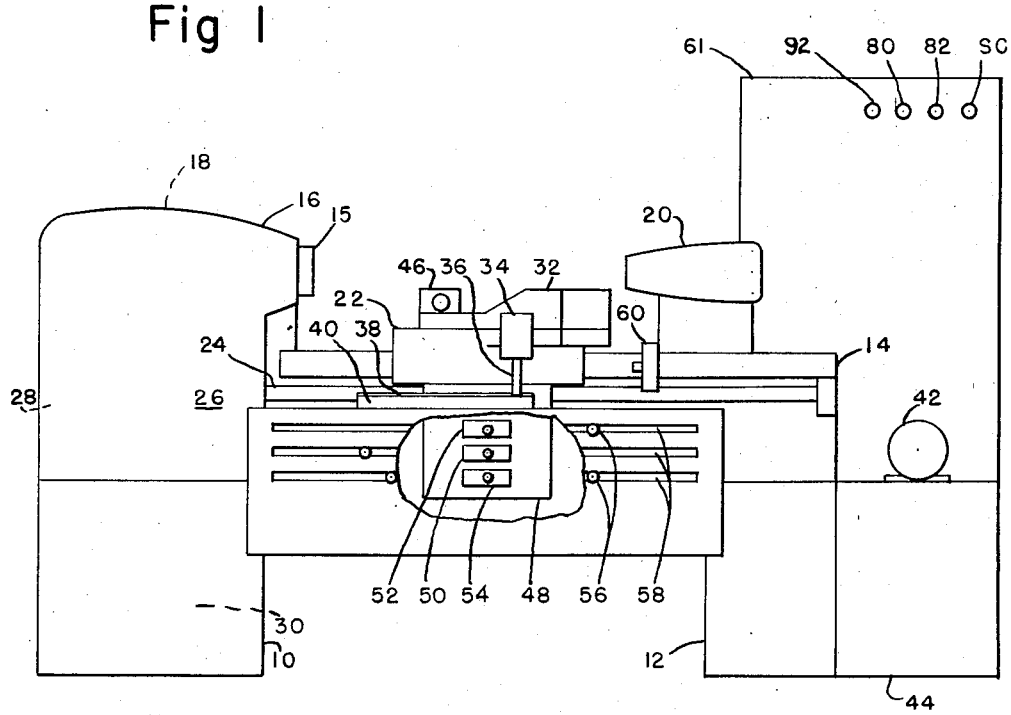

Dec. 9, 1958  W. B. AILES  2,864,046
ELECTRICAL CONTROL SYSTEM
Filed Aug. 29, 1955  2 Sheets-Sheet 1

| POSITION | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|
| A HIGH-LOW | | | | | | | | | | | | | | | |
| B TR. POS'R | | | | X | | X | | X | | | X | | | | |
| C FD. CHG. INTER. | | | | | | | | X | X | | | | | | |
| D TRAV. INTER. | | | X | X | | X | | | | X | | | | | |
| E FD. LIMIT 1 | | | | X | | | | | | X | | | | | |
| F FD. LIMIT 2 | | | | | | X | | | | | | | | | |
| G TRAV. RT. | | | | | X | | X | | | | X | | | | |
| H FEED 1 | | | | X | | X | | X | | X | | | | | |
| J FEED 2 | | | | | | | | | X | | | | | | |
| K HOME | X | X | | | | | | | | | | X | X | X | X |

INVENTOR.
WAYNE B. AILES
BY

AGENT

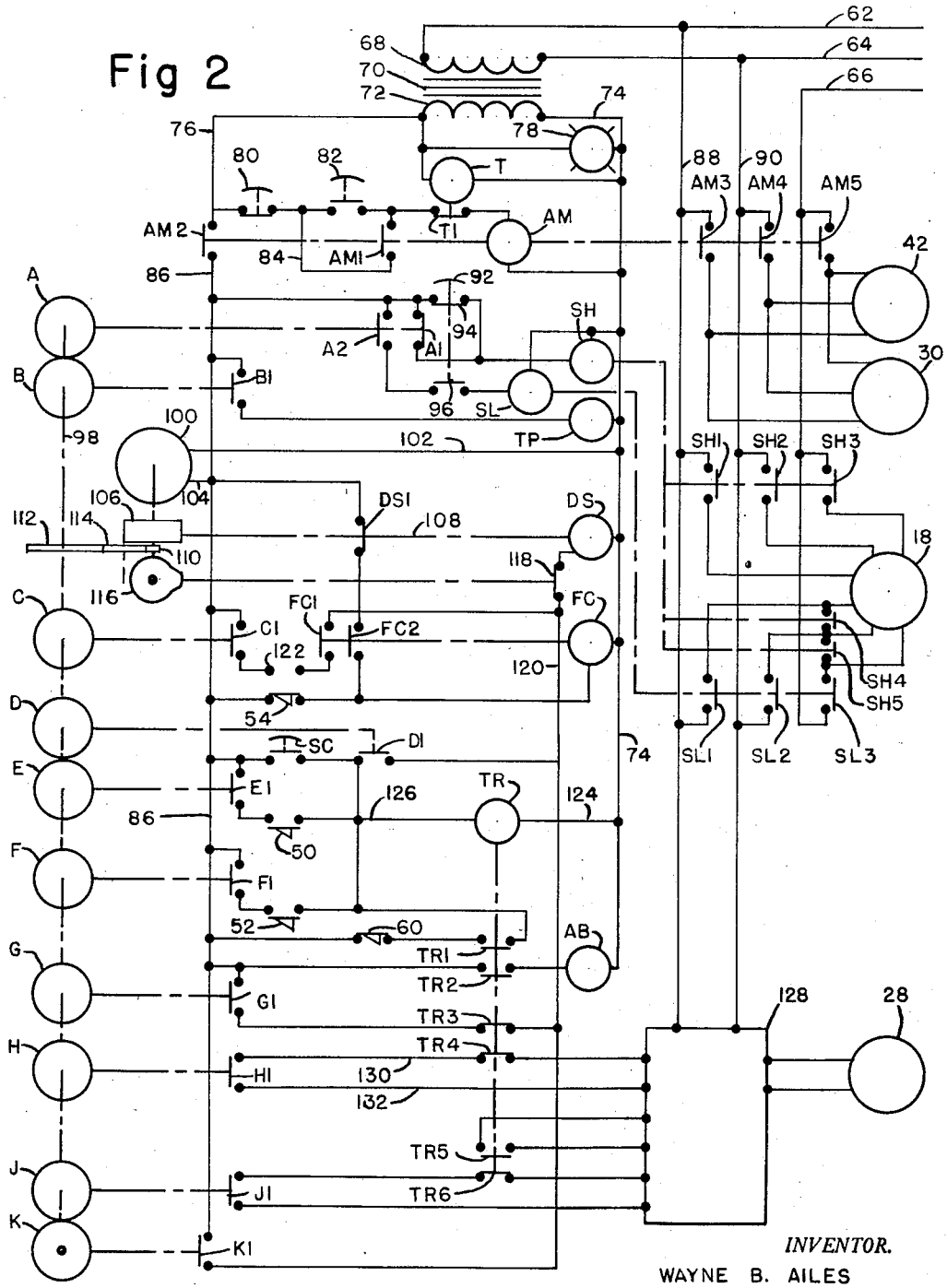

United States Patent Office 2,864,046
Patented Dec. 9, 1958

2,864,046

ELECTRICAL CONTROL SYSTEM

Wayne B. Ailes, Pemberton, Ohio, assignor to The Monarch Machine Tool Company, Sidney, Ohio, a corporation of Ohio Application August 29, 1955, Serial No. 530,963

3 Claims. (Cl. 318—102)

The control of a cyclical system including the actuation of a plurality of electrical devices has long been known in the art. The prior systems generally require the use of a plurality of relays each connected to an energizable electrical element, to limit switches, and to other means, and an electrical cyclic control results. One of the prime disadvantages of this type of system is the requirement that to change the cycle, extensive re-wiring is necessary.

My invention relates to the control of diverse electrical elements, but in contrast to prior systems it uses a plurality of cams arranged to be actuated together and the profile of the cams dictates the particular cycle of the electrical elements connected into the circuit. Since the plurality of cams may be readily changed it is clearly apparent that the cycles may be easily changed simply by changing the group of cams which control and actuate the system.

Accordingly, it is an object of my invention to provide an electrical control system for cyclic actuation of a plurality of electrical elements.

It is a further object of my invention to provide a group of cams to exercise primary control of the electrical elements.

It is another object of my invention to arrange said cams so that they are easily interchanged with a new group to permit a ready and complete change to a new cycle.

Other advantages and objects of my invention will become apparent from the accompanying specification and drawings in which:

Figure 1 shows a front elevation of a lathe which indicates the relative association of one arrangement of the mechanical portions related to my electrical circuit, Figure 2 shows a schematic electrical diagram of the electrical circuit of my invention, and Figure 3 shows one arrangement of the cams as used with my electrical circuit.

Referring now to Fig. 1, this illustration shows a lathe arranged to be actuated by my electrical circuit. While this circuit is of general utility and is adapted to be able to actuate any combination of electrical devices which need be actuated in a particular cyclic order, such cyclic actuation is often used in the machine tool industry for actuation of various elements of machine tools through complete cycles to machine a workpiece, and such cycles should be readily changeable. Thus, a lathe is shown in the illustration. The lathe comprises a headstock leg 10 and a tailstock leg 12 which support a bed 14 thereupon, and upon the bed is mounted a headstock 16 which is driven by a motor 18 mounted behind the headstock and is adapted to drive a workpiece mounted between the spindle 15 in the headstock 16 and the tailstock 20. A carriage 22 is mounted for movement along the bed 14 and is driven therealong by means of a feed rod 24 which is actuated by a gearbox 26 which is driven by a motor 28 mounted within the housing which covers the gearbox 26. Mounted within the headstock leg 10 is an auxiliary motor 30 which drives auxiliaries such as a chip conveyor, auxiliary hydraulic or air power, coolant pump, or the like.

Mounted on the carriage 22 is an angular slide 32 which is controlled by a tracer 34 having a tracer finger 36 which engages a template 38 mounted on the template rail 40. This angular slide and tracer are operated from a motor 42 which operates a hydraulic pump mounted to take suction from a hydraulic sump 44. The slide, tracer and hydraulic system, may be constructed in the particular manner shown in Clarence Johnson Patent Number 2,777,351, granted January 15, 1957, or may be of the variety shown in Serial Number 385,540, filed October 12, 1953, by N. V. Gusching and R. J. Flanigan. Whichever tracer controlled servomotor is used, the depth of cut of the tool mounted in tool slide 46 may be controlled by a multi-cut arrangement such as is shown in Patent Number 2,777,350, granted January 15, 1957, to C. S. Doll, et al. The manner in which this construction permits multiple cuts to be controlled by the instant electrical circuits is more fully explained hereinafter.

An apron 48 is mounted to depend from the carriage 22 and the apron carries on its front a plurality of switches 50, 52, and 54 which respectively control the location of the first feed limit, the second feed limit, and the location of feed rate changes as is more fully explained with reference to the electrical circuit. Dogs 56 are adjustably mounted in slots 58 to actuate said switches. A traverse right limit switch 60 is mounted upon the bed to limit the movement of the carriage 22 toward the tailstock 20. An electrical cabinet 61 is mounted behind the tailstock leg 12 to contain the electrical equipment.

Referring now to Fig. 2, electrical power is supplied by lines 62, 64, and 66; lines 62 and 64 are connected to primary 68 of transformer 70 having a secondary 72. The secondary 72 supplies control circuit power to lines 74 and 76. Connected in parallel between lines 74 and 76 are an indicator lamp 78 and a timer T having a contact T1. Also serially connected between lines 74 and 76 are a normally closed stop button 80, a normally open start button 82, timer contact T1, and the auxiliary motor starter relay AM. Connected around the normally open start button 82 is a line 84 containing normally open contact AM1. A contact AM2 is connected between line 76 and control circuit line 86. Lines 88 and 90 are respectively connected to power supply lines 62 and 64, and contacts AM3, AM4, and AM5 connect the lines 88, 90, and 66 to the motors 30 and 42. Contacts AM1, AM2, AM3, AM4, and AM5 are actuated by the auxiliary motor starter relay AM. Connected between lines 86 and 74 is a selector switch 92 which has contacts 94 and 96. Connected in series with contact 94 is the spindle high motor starter relay SH which has normally open contacts SH1, SH2, SH3, SH4, and SH5 which, when closed, connect the spindle motor to lines 66, 88, and 90 to cause it to run at high speed. Connected in parallel across contact 94 is a contact A1 controlled by cam A mounted on shaft 98. Serially connected between lines 86 and 74 are contact A2 controlled by cam A, contact 96, and the spindle motor low speed starter relay SL which closes normally open contacts SL1, SL2, and SL3 to connect the spindle motor 18 to the power lines to cause it to operate at slow speed. When the selector switch 92 is in the upper position shown, the spindle high motor starter relay SH will be energized whenever lines 74 and 86 are energized. When the selector switch 92 is depressed to make contact 96 effective, then choice between spindle high motor starter relay SH and spindle low motor starter relay SL is dependent upon the configuration of cam A and its controlled contacts A1 and A2. While in some cases it is desirable to use both motor speeds during a cycle, only the higher spindle speed is used in illustrative cycle described hereinafter. Further, while a change in motor speed is illustrated to change spindle speed, it is clearly apparent that relays SH and SL could be used to control clutch or gear shifting for changing spindle speed or direction.

Also serially connected between lines 86 and 74 are contact B1 and tracer positioner solenoid TP. Contact B1 is controlled by cam B and the tracer positioner solenoid TP causes actuation of tracer positioning means such as RS1 of the above mentioned application Serial Number 258,632, filed November 28, 1951, to permit the tool to assume different cutting depths during each of the different cutting portions of the complete cycle. A cam drive motor 100 is connected by line 102 to line 74 by line 104 to line 86 so that it operates continuously during energization of lines 74 and 86 to drive the input member of a one-revolution clutch 106, and the one-revolution clutch is controlled or actuated by a solenoid DS so that when the solenoid DS is actuated its plunger 108 is lifted to permit the clutch to drive gear 110 which drives shaft 98 through gear 112 and idler 114. Rotating with gear 110 is a cam 116 which controls a contact 118 which is closed only when clutch 106 is in the disengaged position. The clutch actuating solenoid DS is connected to line 74 and through contact 118 to line 120.

Serially connected between lines 86 and 120 are contact C1 actuated by cam C which controls the feed change interlock, normally open contact 122 of the feed change switch 54, and normally open contact FC1 of the feed change relay FC. Feed change relay FC is connected in series with the normally closed contacts of feed change switch 54 and line 74. Parallel across the normally closed contacts of feed change switch 54 are serially connected normally closed contact DS1, which is actuated by the clutch solenoid DS, and a normally open contact FC2 which acts as a holding contact.

A traverse right relay TR is connected to line 74 by line 124 and is connected to line 86 through normally open start cycle switch SC and line 126. Connected between line 126 and line 120 is a contact D1 which is controlled by cam D which is the traverse interlock control cam. Connected serially between line 86 and line 126 are the first feed limit switch 50 and the contact E1 which is controlled by cam E which controls the validation of the first feed limit switch 50. Similarly connected between line 86 and line 126 is a second feed limit switch 52 and contact F1, which is controlled by cam F, which controls the validation of the second feed limit switch 52. Serially connected between line 86 and line 126 are normally closed right limit switch 60 and normally open contacts TR1 of the traverse right relay TR. An air-bleed solenoid AB is connected between lines 74 and 86 through normally open contact TR2, and this solenoid is connected to bleed air out of the tracer end of the pneumatic circuit shown and described in Serial Number 625,237, described above, to retract the tool slide during traverse right operation, or is connected to the tracer valve of Serial Number 385,540, mentioned above, to cause the valve to operate in such a direction as to cause retraction of the tool slide. Serially connected between lines 86 and 120 are contacts G1 which are controlled by cam G which is a traverse right control cam and normally closed contacts TR3 of traverse right relay TR.

The feed motor 28 is energized from a rectifier 128 which in turn is energized from the power lines 88 and 90. This rectifier is of a type such as is shown in Patent Number 2,609,524 to C. E. Greene, and this rectifier includes a variable resistance 100 which controls the speed of the motor. In the instant invention a rectifier of this nature is used and in order to get different motor speeds at different points of the cycle, individual resistances are substituted for the resistance 100 of the patent by any well-known switching means. Lines 130 and 132 are connected to arrange such an individual resistance in said rectifier circuit and these lines are controlled to cause the individual resistance to become effective when a circuit is complete through normally closed contact TR4 and contact H1 controlled by first feed rate cam H. Furthermore, cam J with its controlled contact J1 and normally closed contact TR6 causes a different resistance to be substituted for the resistance 100 of the patent to cause the rectifier 128 to operate the motor 28 at a different adjustable speed. Normally open contact TR5 is arranged to close a circuit in the rectifier which causes the motor to reverse by a well-known means and to operate at a high or traverse rate to cause the carriage to move rapidly to traverse right limit switch 60. Also connected between lines 86 and 120 are contacts K1 controlled by cam K which permits the clutch 106 to revolve the cams until they are in home position. The cams A–K are thus predetermined control devices.

Method of operation

Fig. 3 shows the ten different cams A through K with their brief designation, and the "X" in the column opposite the cam indicates that there is a high point on the cam which will cause the associated switch or switches to be actuated. Fig. 3 illustrates a three-cut cycle, but placement of another cam set in the circuit could cause a one- or two-cut cycle or would change various elements of the cycle.

Energization of lines 62, 64, and 66 results in energization of lines 74 and 76 with the illumination of lamp 78 and the starting of timer T. At this time the rectifier 128 is energized through lines 88 and 90 and after sufficient times has elapsed to permit the rectifier heaters to warm up, the timer T times out closing contact T1 to permit starting of the machine. Depressing starting switch 82 energizes relay AM to start the auxiliary motor 30 and hydraulic pump motor 42. Closing of contact AM1 holds in relay AM and contact AM2 energizes line 86. Assuming that the cam shaft 98 is holding its cams in position 13 when the start button is pressed, a circuit is complete through contact K1 and line 120 to contact 118 to energize the clutch solenoid DS to start the clutch 106 on a driving revolution. The clutch will rotate the cams and cam shift 98 to position 3 where contact K1 is open and line 120 will not be energized. In this position cam D has its contact D1 closed and the operator may press the start cycle switch SC to energize line 120 to cause the cams to index one increment to position 4. Here the contact B1 is closed by cam B to actuate the tracer positioner for a first rough cut. The traverse interlock cam D has its contact D1 closed and first feed limit cam E has its first contact E1 closed and feed one cam H causes the carriage to feed left at the first feed rate. When the second feed limit switch 52 crosses its dog 56 it is ineffective to cause change for contact F1 is open. Similarly, feed change does not occur by the closing of contacts 122 by switch 54 when it passes over feed change dogs for contact C1 is open. When the first feed limit switch 50 crosses its dog, energization of the traverse right relay occurs through contact E1, switch 50, line 126, and line 124, and TR holds in through TR1. At this time the air-bleed solenoid AB is energized through contact TR2, the feed is stopped by opening of TR4, and traverse right occurs through the closing of TR5. At the time switch 50 closes it permits a pulse through contact D1 to energize the solenoid DS to index the cams to position 5. In this position only contact G1 of the traverse right cam is closed, and the carriage traverses right until the traverse right limit switch 60 opens dropping out the holding circuit through TR1. Thereupon TR3 closes and completes a circuit from line 86 to line 120 through contact G1 to actuate the clutch operating solenoid DS so that the cams move to position 6. Thereupon the tracer positioner cam B closes its contact B1 to provide a second rough cut. The traverse interlock contact D1 is closed and the second feed limit switch 52 is made effective. Closing of contact H1 keeps the feed at feed rate one and feed to the left occurs to the second feed limit switch dog. Contact F1 is closed and closing of limit switch 52 energizes traverse right solenoid TR which is held in by TR1. Again TR2 closes causing retraction of the tool slide, TR4 opens to stop the feed, and TR5 closes to cause traverse to the right. Since D1 is also closed in position 6 the closing of second feed limit 52 causes energization of line 120 to index the cams to position 7 whereat only traverse right contact G1 is closed.

The carriage traverses right until traverse right limit switch 60 opens the holding circuit for TR which forthwith drops out, closing TR3 to index the cams to position 8. In this position the tracer positioner cam B closes contact B1 to energize the tracer positioner to permit the tracer finger 36 to follow the template 38 to impart the template contour to the tool motion. The feed change interlock cam C closes contact C1 to cause the feed change switch 54 to be effective. Cam H closes contact H1 to cause the carriage to feed left at feed rate 1. Switch 54 was in its lower position until it approached its dog and thereby caused energization of feed change relay FC which closed its contact FC1 and its holding contact FC2. When the switch 54 is raised to close contact at 122 by contact with its dog, the clutch solenoid DS is energized through contacts C1, 122, and FC1 to index one position to position 9 whereat feed rate 2, controlled by cam J, is effective instead of feed rate 1. A slower feed rate is often used during the cutting of right shoulders on lathes and it should be noted that the feed change dog is located at the end of the second rough cut where there is a rise in the template. Feed continues at feed 2 until the feed change switch 54 contacts another dog and contacts 122 are again closed to complete a circuit through now closed contact C1 and FC1 to index the cams to position 10 where the feed continues at feed 1 through the agency of contact H1.

It should be noted that when feed change switch 54 closes contacts 122 and energizes clutch solenoid DS, contact DS1 opens thereby dropping out the holding circuit through FC2 of the feed change relay FC, and relay FC cannot close until the switch 54 is released to its lower position. Thus, the feed change switch 54 is permitted only one indexing of the cams for each feed change dog. Similarly when the clutch begins driving cam 116 to open contact 118 all spurious signals from the cams changing positions will be prevented from reaching solenoid DS. Only when the cam 116 has made a full revolution corresponding to one increment of motion of the cam shaft 98 does the contact 118 again close to permit the proper signals to be impressed therethrough.

In position 10 the first feed limit switch 50 is effective and feed occurs until switch 50 is closed by its dog energizing TR through line 126, and line 120 through contact D1. Thereupon the carriage traverses right through the agency of contact TR5 and the opening of contact TR4 and the cams are indexed to position 11 with the tool retracted through the agency of solenoid AB. In this position the contact B1 is closed to hold the tracer slide fully retracted for unloading and loading. Upon opening of the traverse right limit switch 60 the traverse right relay TR drops out stopping the traverse and closing TR3 which energizes line 120 to cause indexing of the cams to position 12. In this position the home cam K has a rise to close contact K1 and to cause the cams to index until they again reach position 3 to set up the system for another cycle on a new workpiece.

It can be clearly seen that an entire new set of predetermined control devices may be placed in the mechanism to control the electrical devices in a different cyclic sequence.

While I have described my invention in its preferred form it is clearly obvious from its disclosure that it is applicable to other systems and therefore I desire that the scope of my invention be defined by the appended claims.

What I claim is:

1. In an electrical circuit for controlling a plurality of electrical devices, a plurality of predetermined control devices, motor means to actuate said predetermined control devices, said motor means driving an intermittent mechanism and said intermittent mechanism being connected to actuate said predetermined control devices, a solenoid connected to said intermittent mechanism to permit said motor to intermittently actuate said predetermined control devices; a control circuit for controlling the energization of said solenoid, said control circuit including first and second control power lines and a switch having normally open and normally closed contacts, a relay connected to said first control power line and having first and second normally open contacts, a normally closed contactor opened by energization of said solenoid connected to said second control power line and said second normally open relay contact, the normally closed contacts of said switch being connected to said second control power line and to said relay to energize said relay when said switch is not actuated, said solenoid-operated contactor and said second normally open relay contact being serially connected in parallel with said normally closed switch, said normally open contact and said first normally open relay contact being serially connected to said second power line and to said solenoid and said solenoid being connected to said first control power line to energize said solenoid whereby continuous actuation of said switch does not cause continued operation of said solenoid to prevent said predetermined control devices from moving continuously.

2. In an electrical circuit for controlling a plurality of electrical devices, a plurality of predetermined control devices, motor means to actuate said predetermined control devices, said motor means driving an intermittent mechanism and said intermittent mechanism being connected to actuate said predetermined control devices, a solenoid connected to said intermittent mechanism to permit said motor to intermittently actuate said predetermined control devices; a control circuit having first and second control power lines, a relay connected to said first control power line and having a plurality of contacts connected in said control circuit, first and second predetermined control devices adapted to close first and second energization control devices which are connected to said second control power line, first and second switches, said first energization control device and first switch being connected in series with said relay, said second energization control device and second switch being connected in series with said relay, means connecting said solenoid to said first control power line and a relay operated contact connected to said second control power line and to said solenoid to energize said solenoid from said circuit to control the motion of said predetermined control devices.

3. The electric circuit of claim 2 wherein said relay is provided with a holding contact connected to said relay and in series with a third switch which is connected to said second control power line whereby actuation of said third switch causes de-energization of said relay to close said relay-operated contact to cause actuation of said solenoid.

References Cited in the file of this patent

UNITED STATES PATENTS

| | | |
|---|---|---|
| 1,342,915 | Johnson | June 8, 1920 |
| 1,978,947 | Johanson et al. | Oct. 30, 1934 |
| 2,640,958 | Davis | June 2, 1953 |
| 2,764,217 | Goettsch | Sept. 25, 1956 |
| 2,782,350 | Clark | Feb. 19, 1957 |